United States Patent
Partanen et al.

(10) Patent No.: US 7,336,778 B2
(45) Date of Patent: Feb. 26, 2008

(54) CALL HANDLING LOGIC

(75) Inventors: Tiina Partanen, Tampere (FI); Sami Mäki, Tampere (FI); Antti Vuorikoski, Tampere (FI); Jani Ekman, Kangasala (FI)

(73) Assignee: Nokia Corporation, Espoo (FI)

( * ) Notice: Subject to any disclaimer, the term of this patent is extended or adjusted under 35 U.S.C. 154(b) by 388 days.

(21) Appl. No.: 10/324,080

(22) Filed: Dec. 20, 2002

(65) Prior Publication Data

US 2003/0223570 A1    Dec. 4, 2003

(30) Foreign Application Priority Data

Dec. 20, 2001   (GB) ................... 0130596.0

(51) Int. Cl.
  H04M 3/42    (2006.01)
  H04M 3/00    (2006.01)

(52) U.S. Cl. .................. 379/211.02; 379/265.01

(58) Field of Classification Search ........ 379/211.02, 379/211.01, 212.01, 213.01, 201.01, 265.01–265.14, 379/309, 266.01–266.1
See application file for complete search history.

(56) References Cited

U.S. PATENT DOCUMENTS

| 5,563,940 | A | * | 10/1996 | Tsuzuki et al. ............. 379/233 |
|---|---|---|---|---|
| 5,600,704 | A | | 2/1997 | Ahlberg et al. |
| 5,793,859 | A | | 8/1998 | Matthews |
| 5,896,448 | A | * | 4/1999 | Holt .................. 379/221.03 |
| 5,905,789 | A | * | 5/1999 | Will .................. 379/211.01 |
| 6,130,938 | A | | 10/2000 | Erb |
| 6,426,955 | B1 | * | 7/2002 | Gossett Dalton et al. ... 370/401 |
| 6,456,594 | B1 | * | 9/2002 | Kaplan et al. ............. 370/238 |
| 6,556,671 | B1 | * | 4/2003 | Beauvois ............... 379/265.02 |
| 7,062,028 | B2 | * | 6/2006 | Holt et al. ............. 379/211.03 |
| 7,085,363 | B2 | * | 8/2006 | Pelletier et al. ........ 379/201.01 |
| 7,162,020 | B1 | * | 1/2007 | Forte .................. 379/201.01 |

FOREIGN PATENT DOCUMENTS

| WO | WO 98/38781 | 9/1998 |
|---|---|---|
| WO | WO 01/60033 A1 | 8/2001 |

* cited by examiner

*Primary Examiner*—William J. Deane, Jr.
(74) *Attorney, Agent, or Firm*—Squire, Sanders & Dempsey, LLP

(57) ABSTRACT

A method for routing calls in a communication system comprising a network and a plurality of terminals associated with a single subscriber identity, the method comprising: receiving a request to establish a call from a first terminal to the subscriber identity; retrieving from a subscriber information store a set of weighting parameters for the subscriber identity, each of the terminals associated with the subscriber having at least one of the weighting parameters of the set associated with it; determining an order in which to route the call to the terminals based on the weighting parameters; and routing the call to the terminals in that order until the call is terminated or is answered by one of the terminals.

24 Claims, 2 Drawing Sheets

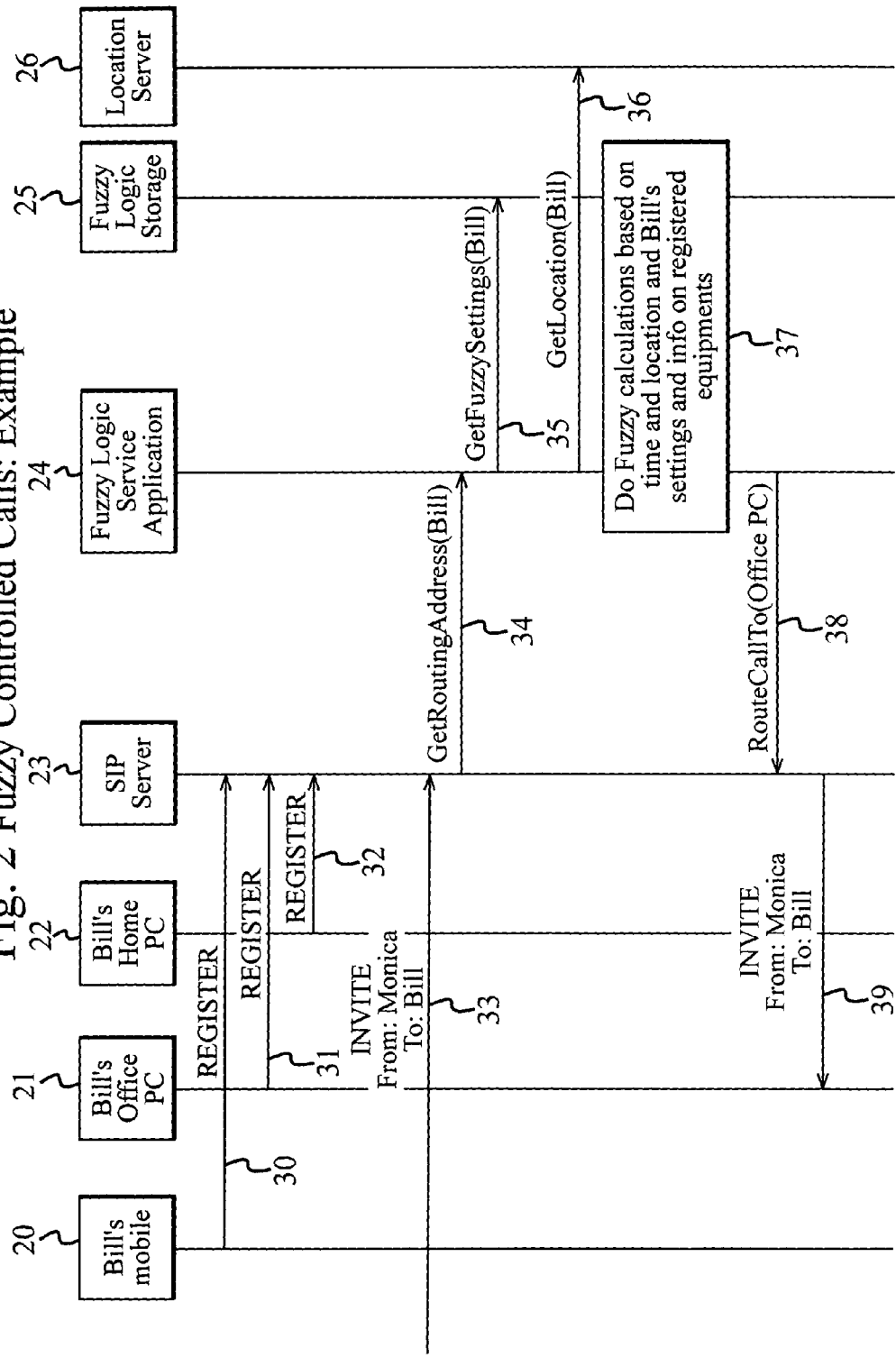

CALL HANDLING LOGIC

BACKGROUND OF THE INVENTION

1. Field of the Invention

This invention relates to logic for handling calls, and especially for routing calls, in a communication system.

2. Description of the Related Art

In modern telecommunications networks, for instance UMTS (universal mobile telecommunication system) networks, an individual subscriber may have a plurality of terminals that are registered to a single network. For instance, the subscriber may have a mobile phone, a home phone, an answering machine and an office phone. When a call is made to the subscriber there is a need for the network to route the call to the appropriate terminal. The network could direct the call to each of the terminals in turn; if there is no answer at one of the terminals then the call can be directed to the next terminal until an answer is had.

Depending on the subscriber's circumstances when the call is made he may prefer the call to be directed to a certain one of the terminals. For example, if the subscriber is at home his home phone may be his preferred means of answering the call; if he is travelling to the office his mobile phone may be preferred; and in the office his office phone may be preferred. Each time the user's preference changes he could send a message to the network to inform the network which of his terminals is now his preferred means of answering calls. However, this would be highly inconvenient for the user since he might frequently have to send such messages.

The subscriber could program the network with a static preset scheme defining the order in which to route an incoming call to the user's terminals. The call could be routed to the terminals one-by-one in that order until it is answered. However, if several terminals are tried unsuccessfully in this way then a considerable amount of time might elapse before the call is routed to the right terminal. This delays the completion of the call, and the calling party might even hang up if the delay is too long.

There is therefore a need for an improved means of determining which of a user's terminals to route calls to.

SUMMARY OF THE INVENTION

According to one aspect of the present invention there is provided a method for routing calls in a communication system comprising a network and a plurality of terminals associated with a single subscriber identity, the method comprising: receiving a request to establish a call from a first terminal to the subscriber identity; retrieving from a subscriber information store a set of weighting parameters for the subscriber identity, each of the terminals associated with the subscriber having at least one of the weighting parameters of the set associated with it; determining an order in which to route the call to the terminals based on the weighting parameters; and routing the call to the terminals in that order until the call is terminated or is answered by one of the terminals.

Preferably each of the terminals associated with the subscriber has at least two of the weighting parameters of the set associated with it. Most preferably each of the terminals associated with the subscriber has at least one weighting parameter associated with it in correspondence with another item of data. The item of data could be the current time of day, day of the week, month of the year, type of the call, or the location of at least one of the terminals associated with the subscriber.

Preferably the determining step comprises establishing the current value of the item of data and determining an order in which to route the call to the terminals based on the weighting parameters corresponding to the current value of the Suitably the subscriber information store stores terminal type data indicating that at least one of the terminals associated with the subscriber is an automated answering device, and the determining step comprises determining on the basis of that terminal type data that that terminal is last in the order. Such terminal type data may be provided to the network by the subscriber or determined automatically by the network from the characteristics of the respective terminal. The automated answering device could be a user terminal such as a home answering machine, or could be a network device such as a network voice mail unit.

Suitably the method comprises the step of: when the call has been answered modifying the weighting parameters to increase the likelihood that the terminal at which the call was answered will be the terminal to which a subsequent call will be routed first. That modification may also be dependant on one or more parameters of the calls. Thus, suitably the method comprises the step of: when the call has been answered modifying the weighting parameters to increase the likelihood that the terminal at which the call was answered will be the terminal to which a subsequent call having at least one parameter in common with the call will be routed first. The parameter may be the time of day at which the calls were made, and suitably whether it falls within one or more predetermined windows of time (e.g. each having a duration of one hour); the originator of the calls, or whether the originator falls within a set of originators (e.g. originators having part of their phone numbers in common); or the type of the calls (e.g. whether they are voice, data or fax calls).

Conveniently, the weighting parameters are at least partially determined on the basis of data provided to the system by the subscriber. Such data provided to the system by the subscriber can be provided in the form of a form.

The weighting parameters may express a plurality of conditional rules determining the order in which the call is to be routed to the terminals of the set. Alternatively, the weighting parameters may be neural network weighting parameters and the determining step is performed by neural network processing of the parameters. Both types of weighting parameters could be used.

Suitably the call is routed by means of the SIP protocol.

The method may comprise terminating the call once it has been routed to all the terminals of the set.

If the same weighting is determined for two or more of the terminals (indicating that a single preferred terminal was not found) then the call may be forked in parallel to all of them. Alternatively, the call may be routed to each one of them in turn according to a predetermined scheme for resolving conflicts of that sort.

The method may comprise the step of routing the call to one of the terminals, waiting for a predetermined period of time for the call to be answered at that terminal and then routing the call to the next terminal in the order. Alternatively the routing list could be presented to the caller and the caller may select his/her preferred destination.

According to another aspect of the invention there is provided a communication system comprising: a plurality of terminals associated with a single subscriber identity; and a network comprising: a router arranged to receive a request to establish a call from a first terminal to the subscriber identity; a routing logic unit arranged to retrieve from a subscriber information store a set of weighting parameters for with the subscriber identity, there being at least one weighting parameter associated with each of the terminals associated with the subscriber; and to determine an order in which to route the call to the terminals based on the weighting parameters; and to control the router to route the call to the terminals in that order until the call is answered by one of the terminals.

According to another aspect of the invention there is provided a method for routing calls in a communication system comprising a network and a plurality of terminals associated with a single subscriber identity, the method comprising: receiving a request to establish a call from a first terminal to the subscriber identity; retrieving from a subscriber information store a list of the terminals associated with the subscriber identity; transmitting the list to the first terminal; receiving a message from the first terminal indicating an order in which the call is to be routed to two or more of the terminals in the list; and routing the call to the terminals in accordance with the indicated order.

According to another aspect of the invention there is provided a communication terminal capable of originating calls to other terminals and comprising: an address store for storing addresses of other terminals; a user interface for presenting the addresses to a user whereby the user can select one of the addresses for originating a call to that address; and a user interface controller for controlling the user interface to set the order in which the addresses are presented to the user, the user interface controller comprising a fuzzy logic processing arrangement arranged to correlate the addresses to which calls are originated with at least one other parameter and to set the order based on the result of that correlation.

According to another aspect of the invention there is provided a routing control unit for a communication system comprising: a plurality of terminals associated with a single subscriber identity; and a network comprising: a router arranged to receive a request to establish a call from a first terminal to the subscriber identity; and a routing logic unit arranged to retrieve from a subscriber information store a set of weighting parameters for use with the subscriber identity, there being at least one weighting parameter associated with each of the terminals associated with the subscriber; and to determine an order in which to route the call to the terminals based on the weighting parameters; and to control the router to route the call to the terminals in that order until the call is answered by one of the terminals; the routing control unit being arranged to set the weighting parameters in dependence on past answering of calls by the terminals.

BRIEF DESCRIPTION OF THE DRAWINGS

The present invention will now be described by way of example with reference to the accompanying drawing, in which:

FIG. 2 is a signalling diagram illustrating routing of a call.

DETAILED DESCRIPTION OF THE PREFERRED EMBODIMENTS

Figure 1:
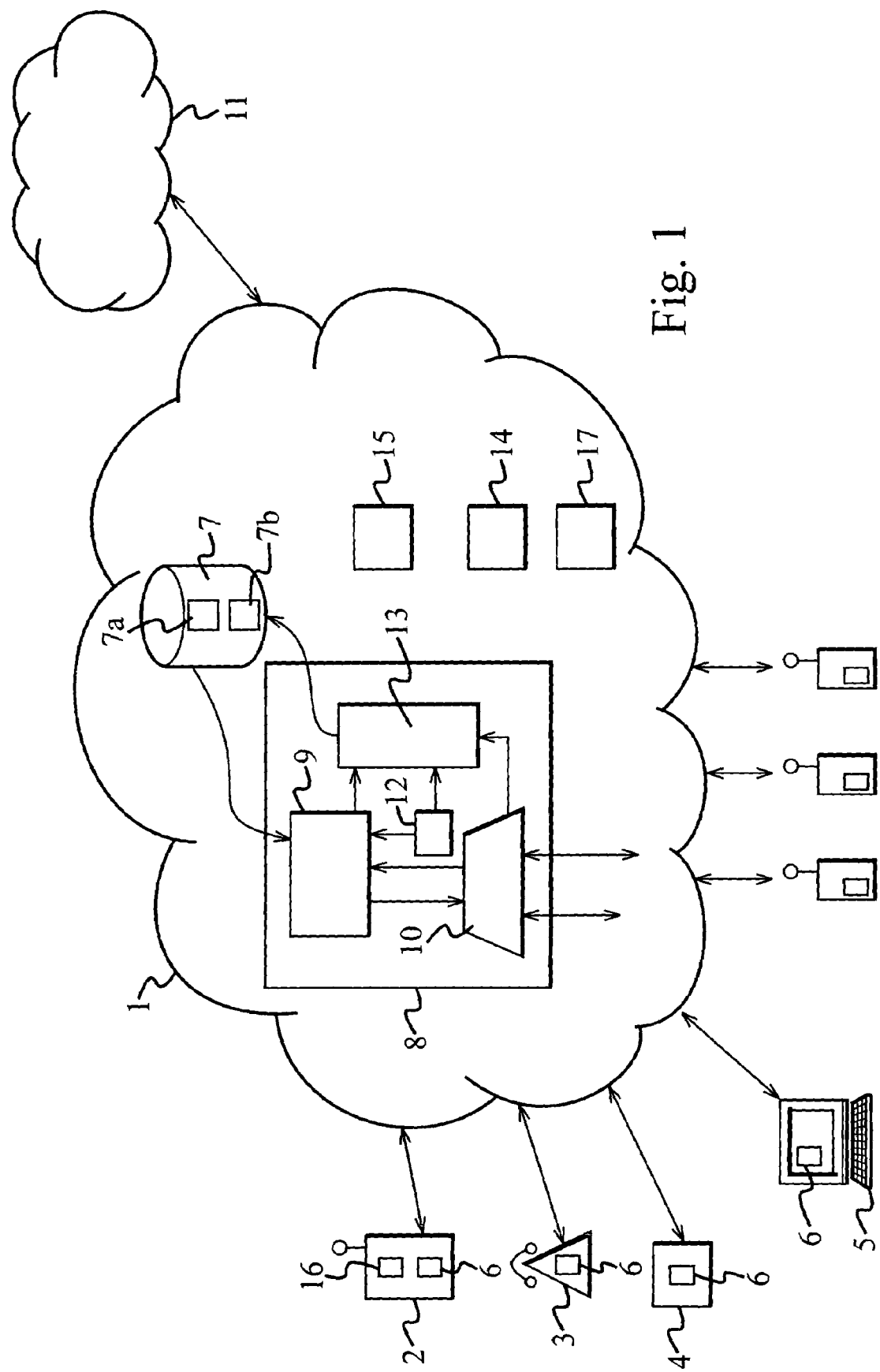
FIG. 1 is a schematic diagram of a communication system.

FIG. 1 shows a communication system. The communication system comprises a network shown generally at 1 connected to a series of terminals 2, 3, 4, 5 etc. Each of the terminals is capable of communicating with other terminals by way of the network. Each terminal may have a unique identity stored in a respective identification module 6. The terminal informs the network of its identity, and calls can be routed to the terminal by the network on the basis of that identity. If the terminal doesn't have the identification module the user identification may be done on the application level using appropriate authentication methods. The network includes a subscriber database 7a and a service database 7b. The subscription and service details of each subscriber to the network are stored in the subscriber and service databases, respectively. Those details can include a common address (e.g. a telephone number) for that subscriber, and a list of used identities associated with that subscriber. These identities may vary from alias names to additional subscriber identities (which may belong to other end users also). The network also includes a routing control unit 8. The routing control unit routes calls addressed to a destination address to the appropriate terminal or to the terminating network. The choice of which terminal or network the call should be routed to is made by a routing logic unit 9. The routing is performed by a router 10. The routing logic unit 9 is connected to the subscriber and service databases for reading information from the databases, and to the router 10 for determining information on incoming calls and for controlling the router.

The router may be, for example, the S-CSCF as defined in the 3GPP standards or it can be any network element performing switching or routing.

If a protocol such as SIP is used then instead of controlling router 10 directly, the routing logic unit 8 could control a SIP server for transmitting the appropriate SIP messages to terminals to set up the desired routing arrangement. In this situation the router would be responsive to information transmitted by the terminals in their communications.

When a call is made to a terminal in the network—either from another terminal in the network, or from a terminal in another network such as network 11—the call is passed to router 10 of routing control unit 8. The routing logic unit 9 determines from the router 10 the destination address of the call, which represents the address of a subscriber to the network. The routing logic unit 9 interrogates the subscriber database and the service database for information on that subscriber and processes that information together with information from an environmental information unit 12 to determine which terminal to route the call to. The processing used by the routing logic unit is described in more detail below. If the subscriber has more than one terminal then the routing logic unit may control the router to route the call to each of those terminals in turn or parallel. Typically, the activities of the routing logic unit to route a call will end when the call is answered, the call is terminated by the calling party, the call has been routed to all the terminals of the subscriber to which it is addressed, or the routing process times out.

The environmental information unit 12 provides information on environmental conditions, such as the current time of day, day of the week and month. It could also provide information on factors such as whether it is currently a public holiday or it could retrieve relevant information from external sources. The environmental information unit includes a clock and suitable mechanisms whereby it can amass this information.

The routing control unit 8 also includes a feedback unit 13. The feedback unit monitors the routing process, receiving information from the router 10, the environmental information unit 12 and the routing logic unit 9, and based on what it detects it feeds back parameters to the service database. Those parameters are then used by the routing logic unit 9 for determining how to route subsequent calls.

The routing and feedback procedures will now be described in more detail.

A neural network procedure is employed, whereby the network effectively learns the subscriber's preferences. For each of the subscriber's terminals the service database stores one or more weighting values which are determined at least partially by the feedback unit 13 based on the past incidence of calls having been answered at the respective terminal. The weighting values may also carry information on the incidence of calls being answered at the respective terminal in conjunction with other factors such as the type of the call and information from the environmental information unit. To determine where to route a call the routing logic unit 9 applies those factors to determine in which order to route the call to the terminals. A neural network arrangement is preferably used to set and use the factors.

The objective of the procedure is to determine, based on the information available to the routing unit, at which of the user's terminals an incoming call is most likely to be answered, and to route the call to that terminal first.

In the most simple arrangement there is a single factor for each of the subscriber's terminals, representing the past incidence of calls having been answered at that terminal. When an incoming call is received it is first routed to the terminal having the highest incidence of calls having been answered. If after a predetermined time period the call is not answered there then it is routed to the terminal having the next highest incidence. This is repeated until the call has been routed to all the terminals or has been answered. Other factors may cause the process to terminate: typically the termination of the call by the calling party. If the call is not answered at any of the user's terminals it may be routed to a voicemail unit 14 within the network 1.

To set the factors, when a call is answered the feedback unit boosts the factor of the terminal at which the call is answered in conjunction with any other currently sensed data and correspondingly reduces the factors of the subscriber's other terminals in conjunction with that data.

In more complex arrangements there can be additional factors to hold information on the likelihood of calls being answered in conjunction with other sensed data. The other sensed data may be information determined from:

the call itself—for example the type of the call including media types (e.g. voice, data, fax, video, gaming, conference, chat, instant message, SMS, MMS), the subject of the call, the identity of the caller or any other suitable parameter provided by the protocol;

information derived from or retrieved by the environmental information unit 12—for example the time of day, the day of the week, the month, the season and whether it is a public holiday;

subscriber status variables stored in the store 7b—these could be set by the subscriber to indicate his status, for instance whether he is on holiday;

information on the subscriber's terminals as determined from the network 1 itself—these could include whether a terminal is currently engaged in a call, whether it is roaming in another network, the geographical location of any of the subscriber's mobile terminals as determined by a location server 15, the address to which the subscriber last originated a call, information derived from a presence server 17 (describing the preferred contacting methods and media types for a subscriber).

The weighting factors could be applied in accordance with this data in the normal ways used for neural network processing.

The location server is capable of determining the location of terminals in the normal way. Typically a subscriber will often carry his mobile phone with him. Thus, when the subscriber is in his office and may prefer to answer calls using his office phone, his mobile phone will be located at his office. Thus the location of one terminal (the mobile phone) may provide information to the network that helps to indicate that the subscriber is likely to want to answer a call using another terminal (the office phone).

The subscriber could define a set of groups of callers, and the factors could support a dependence of the routing scheme on the group (if any) to which an incoming caller belongs. This could allow the subscriber to have the network route calls differently depending on whether the caller is in a group of, for instance, personal or work contacts.

A very simplified example of the operation of the method will be described with reference to table 1.

TABLE 1

|  | 11 am-12 pm | 12 pm-1 pm | 1 pm-2 pm |
| --- | --- | --- | --- |
| Terminal 1 | .1 | .6 | .3 |
| Terminal 2 | .7 | .3 | .5 |
| Terminal 3 | .2 | .1 | .2 |

Table 1 shows a set of factors corresponding to terminals 1, 2 and 3 in conjunction with three time periods: 11 am-12 pm, 12 pm-1 pm and 1 pm-2 pm. The factors indicate the past incidence of calls having been answered at the respective terminal in the respective time period. A higher factor indicates a greater incidence. Suppose an incoming call is received at 1:30 pm. The routing logic unit 9 determines the current time from the environmental information unit and either calculates the factors using the neural network node values and the corresponding algorithms or uses a pre-calculated set of factors (corresponding to the right-hand column of the table). Both the neural network node values and the pre-calculated values are retrieved from the service database. The highest of those factors corresponds to terminal 2, so the routing logic unit causes the router 10 to route the call to terminal 2. If the call is not answered there then within a set period such as 15 seconds the call is routed to the terminal corresponding to the next highest factor: terminal 1. Suppose the call is answered at terminal 1. The feedback unit 13, which has been monitoring the routing process boosts the factor appropriate to the prevailing environmental conditions (here, the time of day) and the terminal at which the call was answered, and reduces the factors appropriate to the prevailing environmental conditions and the terminals at which the call was not answered. The resulting factors could be as shown in table 2.

TABLE 2

|  | 11 am-12 pm | 12 pm-1 pm | 1 pm-2 pm |
| --- | --- | --- | --- |
| Terminal 1 | .1 | .6 | .35 |
| Terminal 2 | .7 | .3 | .475 |
| Terminal 3 | .2 | .1 | .175 |

More factors could be used in order to take account of data on other environmental conditions etc. The combination of those weighting factors could be done by normal neural network programming.

In addition to the factors being set by means of the feedback unit's monitoring of successful and unsuccessful routing operations, the factors could be set by more direct means. For example, before, during or after a call has been completed the network could send a message to the subscriber to ask whether the call was answered at the terminal he would have preferred. The factors could be modified based on the response. After a call has been completed the network could send a message to the terminal at which the call was answered requesting whether the user who answered the call was the right person to be reached. In response to that message, information about the correctness of the routing could be returned to the network and the feedback that is applied could be dependent on that response: if the call was not answered by the right person then the factor for the terminal at which it was answered may be reduced. The question about the correctness of the routing can also be asked from the caller and this information may be used as input for the feedback unit.

If any of the terminals are answering machines then they will generally answer any calls directed to them. Therefore, the subscriber or service database preferably has provision for storing an indication of whether a terminal is an answering machine so as to exclude it from the neural network process. Terminals having such an indication are preferably the last to have the call routed to them.

The list of a subscriber's terminals may also include call diversion addresses, for instance phone numbers, corresponding to terminals in other networks. The diversion scheme can be learned by the network by following the user redirecting interactively unwanted incoming calls. This works only for the terminals capable of redirection mechanisms. Preferably, the network learns this new redirection information only when the redirection is done to one of the pre-configured numbers.

The extent to which the factors are changed after a call has been answered or unanswered may depend on information such as the time taken to answer the call and the amount of learning that has already been done for that subscriber. Suitably, the longer the period between routing a call to a terminal and the call being answered at that terminal, the less the factor(s) corresponding to that terminal is(are) boosted for its answering of the call. Suitably, the extent to which the modification is made reduces as the amount of learning that has been done increases.

The feedback unit 13 could potentially consume a considerable amount of processing resources. To reduce the amount of processing that is needed, the feedback unit could be disabled in respect of a particular subscriber once it has set the factors during an initial learning period for that subscriber. The system could also provide the facility for a subscriber to disable the feedback unit in respect of his calls during periods when he is not answering calls in accordance with his normal routine—for example when he is on holiday.

The initial values of the factors may by equal, or to accelerate the network's learning process the factors could be preset based on input from the subscriber regarding the subscriber's preferences. The initial input may be provided by the user completing a form, preferably using an appliance such as a web browser connected to the network. Alternatively, during an initial training period the subscriber could send a message to the network each time he changes his preferred terminal to inform the network what his new preferred terminal is; and at the end of the training period the network could store factors corresponding to the preferences indicated by the subscriber. The factors could similarly be estimated by the network identifying the terminal from which the subscriber originates calls from time to time and taking that terminal to be the one on which the subscriber would prefer to receive calls. The system may provide the facility for a subscriber to reset his factors to initial values. This may be useful to accelerate the training of the system if the user's lifestyle changes suddenly. The network could provide an interface, for instance a web interface, to allow a subscriber to edit his factors directly or indirectly.

As indicated above, after directing the call to a terminal the network waits for a period so that the call can be answered there. During that period the network preferably triggers an alerting mode of the terminal by transmitting an alert message to the terminal. Thus, the terminal could ring during that period. The length of the period could be preset in the network to, for instance, 15 or 20 seconds. This value can be configured by the user.

A similar procedure could be applied to originating calls. This could be done by means of similar neural network parameters for originating service in the network, or the user terminal could learn to which addresses (e.g. telephone numbers) the user is most likely to originate calls under certain environmental conditions (e.g. time of day and/or location of the terminal). Then, when a user wishes to initiate a call the terminal or network service could first prompt the user with the addresses determined to have been called most often using this subscription under the currently prevailing conditions. To enable a system of this type, the factors could be stored in a memory at the terminal itself (e.g. memory 16) or as part of the subscriber's record in the service database 7b. An advantage of the latter mode of storage is that the data could be accessed by whichever terminal the subscriber makes the call from.

When a subscriber is roaming in a visiting network the visiting network could contact his home network to determine the routing information for calls.

Instead of the network learning the parameters, as described above, the parameters could be set solely by the subscriber's programming. Means for achieving this can be as described above. In this case, it is preferred that the network can interpret preferences indicated by the user by means of fuzzy logic statements. For the user to provide his preferences to the network it is preferred that the network offers a form-based programming interface, for example using a web server. The interface preferably provides the user with a list of available tests that can be applied in relation to an incoming call and available actions to be taken in relation to the call. in this scheme also originating side routing rules can be applied. This mechanism also provides usage of a wider range of parameters.

Examples of the tests are as follows:
Is cost of call greater than a set amount?
Is cost per unit time of the call greater than a set amount?
Is the time of day between one set time and another?
Is an importance flag of the call set to high?
Is the call of a set type?
Is the call originated by a set subscriber or a subscriber who is a member of a set group of subscribers?
Is the determined location of one of the subscriber's terminals within or outside a set area?

The tests may be linked with Boolean expressions such as AND, OR, and NOT.

Examples of the actions are as follows:
Route the call to a set one of the subscriber's terminals (including virtual terminals such as diverts or voice mail devices), or to the subscriber's terminals in a set order.

Carry the call with quality of service (QoS) parameters in a set range.

Route the call via a set network.

Route the call via a network of a set type, for instance the cheapest network.

These tests and actions are parsed into rule statements by the subscriber, and the details of those statements are stored in the subscriber's record in the service database 7b. When a call to the subscriber reaches the routing control unit 8 the routing logic unit 9 retrieves the details from the subscriber's record and applies the appropriate control to the router and, if necessary, other parts of the communication system in order to handle the call as set by the subscriber. If necessary, the subscriber can set priorities to each rule so that the network could select just one routing destination if multiple destinations exist after fuzzy calculations. If this method is used in conjunction with the neural network method described above then this method preferably takes priority in the event of any conflict between the routing rules.

Examples of rule statements that can be parsed by the user are:

"If price of call is greater than 20 c per minute and time of day is between 9 pm and 6 am then use QoS parameter less than 2"

"If call's importance flag is set then route calls to terminal 1 [subscriber's mobile phone]"

"If location is more than 10 km from x [subscriber's office location] then route calls to terminal 1"

"If call type is multimedia and importance flag is not set then route call via cheapest route"

FIG. 2 shows an example of signalling to perform routing of the type described above using SIP. In FIG. 2, terminals 20, 21, 22 could correspond to terminals 2, 3, 4, 5 in FIG. 1. SIP server 23 performs processing of SIP messages for call set-up. Fuzzy logic service application 24 is embodied in routing logic unit 9 of FIG. 1. Fuzzy logic storage 25 is embodied in the service data store 7b of FIG. 1. Location server 26 corresponds to location server 15 of FIG. 1.

In operation, the terminals 20, 21, 22 for subscriber Bill register with the network by communicating in the normal way with SIP server 23. (See 30, 31, 32). Then a SIP INVITE message is received by the SIP server. (See 33). The INVITE message specifies subscriber Monica as the A subscriber and subscriber Bill as the B subscriber for the desired call. In response to the INVITE message the SIP unit transmits a routing request message 34 to the fuzzy logic service application to request advice on how to route the call. The routing request message includes details of the A and B subscribers and the type of the call. The fuzzy logic service unit retrieves (at 35) from the fuzzy logic storage 25 details of the B subscriber's routing settings. If these settings include dependence of routing on location then the fuzzy logic service unit also determines the location of the B subscriber's terminal(s) from the location server 26. (See 36). The fuzzy logic service application then processes the settings and the other information that it has in order to determine how the call should be handled. (See 37). Based on that processing the fuzzy logic service application returns a control message 38 to the SIP server to inform the SIP server how the call is to be handled. In this case the control message indicates that the call is to be routed to the B subscriber's terminal 21. The SIP server then proceeds in accordance with the control message, in this case sending a SIP INVITE message to terminal 21. (See 39). Then the set-up of the call continues as normal.

The calls may be circuit switched calls or packet switched calls, for example using voice over IP (internet protocol). The calls may be voice and/or data calls.

As indicated above, the terminals may be capable of signalling according to the SIP protocol.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method for routing calls, the method comprising:
receiving a request to establish a call from a first terminal to a subscriber identity;
retrieving from a subscriber information store a set of weighting parameters for the subscriber identity, wherein each of a plurality of terminals that is associated with the subscriber is additionally associated with at least one of the weighting parameters of the set of weighting parameters;
determining an order in which to route the call to the plurality of terminals based on the set of weighting parameters; and
routing the call to the plurality of terminals according to the order until the call is terminated or is answered by one of the plurality of terminals,
wherein each of the terminals that is associated with the subscriber is additionally associated with at least one weighting parameter in correspondence with another item of data, wherein the item of data represents a type of call, and
wherein the calls are routed in a communication system, and the communication system includes a network and the plurality of terminals associated with a single subscriber identity.

2. A method as claimed in claim 1, wherein each of the terminals associated with the subscriber has at least two of the weighting parameters of the set associated with the plurality of terminals.

3. A method as claimed in claim 1, wherein the determining step comprises establishing a current value of the item of data and determining the order in which to route the call to the plurality of terminals based on the weighting parameters corresponding to the current value of the item of data.

4. A method as claimed in claim 1, wherein the subscriber information store stores terminal type data indicating that at least one of the plurality of the terminals associated with the subscriber is an automated answering device, and the determining step comprises determining based upon the terminal type data indicating a last terminal is last in the order.

5. A method as claimed in claim 1, comprising the step of:
when the call has been answered, modifying the set of weighting parameters to increase the likelihood that an answering terminal at which the call was answered will be a subsequent terminal to which a subsequent call will be routed first.

6. A method as claimed in claim 1, comprising the step of:
when the call has been answered, modifying the set of weighting parameters to increase a likelihood that an answering terminal at which the call was answered will be a subsequent terminal to which a subsequent call having at least one parameter in common with the call will be routed first.

7. A method as claimed in claim 6, wherein the at least one of the weighting parameters indicates whether a plurality of calls fall within a predetermined time period.

8. A method as claimed in claim 5, wherein an extent to which the set of weighting parameters are modified is dependant on a delay, wherein the delay is defined as a time period from when the call is routed to the terminal to when the call is answered by the terminal.

9. A method as claimed in claim 1, comprising the step of:
when the call has been redirected from the at least one of the plurality of terminals to another terminals modifying the set of weighting parameters to increase a likelihood that a subsequent terminal to which the call was redirected will be a next terminal to which a subsequent call will be routed first.

10. A method as claimed in claim 1, wherein the set of weighting parameters are at least partially determined on a basis of data provided to a system by the subscriber.

11. A method as claimed in claim 10, wherein the data provided to the system by the subscriber is provided in a format representing a form.

12. A method as claimed in claim 1, wherein the set of weighting parameters express a plurality of conditional rules determining the order in which the call is to be routed to the plurality of terminals.

13. A method as claimed in claim 1, wherein the set of weighting parameters are neural network weighting parameters and the determining step is performed by neural network processing of the set of weighting parameters.

14. A method as claimed in claim 1, wherein the call is routed by a SIP protocol means.

15. A method as claimed in claim 1, comprising terminating the call once the call has been routed to all the terminals of the plurality of terminals.

16. A method as claimed in claim 1, wherein the step of routing the call to the plurality of terminals comprises routing the call to one of the plurality of terminals, waiting for a predetermined period of time for the call to be answered at the one of the plurality of terminals and then routing the call to a next terminal in the order.

17. A method as claimed in claim 1, wherein if the weighting parameters indicate an equal priority for two or more of the terminals the step of routing the call to the terminals comprises the step of routing the call in parallel to all of those terminals.

18. A method as claimed in claim 1, wherein the determining of the order is performed by fuzzy logic processing.

19. A communication system comprising:
a plurality of terminals associated with a single subscriber identity; and
a network comprising:
a router arranged to receive a request to establish a call from a first terminal to the subscriber identity;
a routing logic unit arranged to retrieve from a subscriber information store a set of weighting parameters for use with the subscriber identity, there being at least one weighting parameter associated with each of the plurality of terminals associated with the subscriber; and to determine an order in which to route the call to the plurality of terminals based on the set of weighting parameters; and to control the router to route the call to the plurality of terminals according to the order until the call is answered by one of the plurality of terminals,
wherein the at least one of the plurality of terminals that is associated with the subscriber is additionally associated with at least one weighting parameter in correspondence with another item of data, and
wherein the item of data represents a type of call.

20. A method for routing calls in a communication system, the method comprising:
receiving a request to establish a call from a first terminal to a subscriber identity;
retrieving from a subscriber information store a list of a plurality of terminals associated with the subscriber identity;
transmitting the list to the first terminal;
receiving a message from the first terminal indicating an order in which the call is to be routed to at least two of the plurality of terminals in the list; and
routing the call to the plurality of terminals in accordance with the indicated order,
wherein the calls are routed in a communication system including a network and a plurality of terminals associated with a single subscriber identity.

21. A communication terminal comprising:
an address store for storing addresses of other terminals;
a user interface for presenting the addresses to a user whereby the user can select one of the addresses for originating a call to that address;
and a user interface controller for controlling the user interface to set the order in which the addresses are presented to the user, the user interface controller comprising a fuzzy logic processing arrangement arranged to correlate the addresses to which calls are originated with at least one other parameter and to set the order based on the result of that correlation,
wherein the communication terminal is capable of originating calls to other terminals.

22. A communication terminal as claimed in claim 21, wherein another parameter is at least one of: a time of day, a day of a week and a location of the terminal.

23. A routing control unit for a communication system comprising: a plurality of terminals associated with a single subscriber identity; and a network comprising: a router arranged to receive a request to establish a call from a first terminal to the subscriber identity; and a routing logic unit arranged to retrieve from a subscriber information store a set of weighting parameters for use with the subscriber identity, there being at least one weighting parameter associated with each of the plurality of terminals associated with the subscriber; and to determine an order in which to route the call to the plurality of terminals based on the set of weighting parameters; and to control the router to route the call to the plurality of terminals according to the order until the call is answered by at least one of the plurality of terminals; the routing control unit being arranged to set the set of weighting parameters in dependence on past answering of calls by the plurality of terminals, wherein the at least one of the plurality of terminals associated with the subscriber is additionally associated with at least one weighting parameter in correspondence with another item of data, and wherein the item of data represents a type of call.

24. A communication terminal comprising:
storage means for storing addresses of other terminals;
presenting means for presenting the addresses to a user whereby the user can select one of the addresses for originating a call to that address; and
controlling means for controlling the user interface to set the order in which the addresses are presented to the user, the user interface controller comprising a fuzzy logic processing arrangement arranged to correlate the addresses to which calls are originated with at least one other parameter and to set the order based on the result of that correlation.

* * * * *